(12) United States Patent
Ekins

(10) Patent No.: US 9,303,723 B2
(45) Date of Patent: Apr. 5, 2016

(54) DUCT GRIP ANCHOR SYSTEM

(76) Inventor: William James Ekins, North Vancouver (CA)

( * ) Notice: Subject to any disclaimer, the term of this patent is extended or adjusted under 35 U.S.C. 154(b) by 0 days.

(21) Appl. No.: 13/637,737

(22) PCT Filed: Apr. 1, 2011

(86) PCT No.: PCT/CA2011/000368
§ 371 (c)(1),
(2), (4) Date: Sep. 27, 2012

(87) PCT Pub. No.: WO2011/120157
PCT Pub. Date: Oct. 6, 2011

(65) Prior Publication Data
US 2013/0034386 A1 Feb. 7, 2013

(30) Foreign Application Priority Data

Apr. 1, 2010 (CA) ....................................... 2698434

(51) Int. Cl.
| | |
|---|---|
| *E04C 5/08* | (2006.01) |
| *F16G 11/04* | (2006.01) |
| *B63B 21/04* | (2006.01) |
| *F16G 11/10* | (2006.01) |

(52) U.S. Cl.
CPC ................ *F16G 11/04* (2013.01); *B63B 21/04* (2013.01); *F16G 11/105* (2013.01); *Y10T 403/7052* (2015.01)

(58) Field of Classification Search
CPC ....... F16G 11/04; F16G 11/044; B63B 21/04; B63B 21/18; B63B 21/00; B63B 2021/005; Y10T 403/7052
USPC ............. 52/166, 223.13, 125.2, 125.4, 125.5; 24/115 N, 127, 130, 136 R, 136 L; 403/367–369, 371, 374.1
See application file for complete search history.

(56) References Cited

U.S. PATENT DOCUMENTS

| | | | |
|---|---|---|---|
| 3,820,832 A | | 6/1974 | Brandestini et al. |
| 4,066,368 A | * | 1/1978 | Mastalski et al. ............. 403/211 |

(Continued)

OTHER PUBLICATIONS

Description of Non-Ferrous Metals provided by the Engineer's Handbook and found in the wayback machine, dated Feb. 17, 2009: http://web.archive.org/web/20090217214556/http://engineershandbook.com/Materials/nonferrous.htm.*

(Continued)

*Primary Examiner* — Brian Mattei
(74) *Attorney, Agent, or Firm* — Kilpatrick Townsend & Stockton LLP

(57) ABSTRACT

An anchor system including at least one flexible interconnection device. A restraint device is on the at least one flexible interconnection device. The restraint device and the flexible interconnection device form a combination. The anchor system includes a terminal object having an exterior surface and an interior surface that defines a duct for receiving a portion of the flexible interconnection device. The duct has a first end, a second end, and an interior portion. The terminal object includes a metallic-iron-free load-bearing structure that defines a load-bearing surface such that when the flexible interconnection device is positioned through the duct and when a tensional force is applied to the interconnection device, the tensional force urges the combination against the load-bearing surface such that the metallic-iron-free load-bearing structure impedes the combination from traversing the duct in response to the tensional force by bearing the resultant load.

38 Claims, 8 Drawing Sheets

(56) References Cited

U.S. PATENT DOCUMENTS

| | | | |
|---|---|---|---|
| 4,615,532 A * | 10/1986 | Biller et al. | 279/32 |
| 4,633,540 A * | 1/1987 | Jungwirth et al. | 14/22 |
| 5,345,742 A * | 9/1994 | Rogowsky et al. | 52/698 |
| 5,913,641 A * | 6/1999 | Long | 405/302.2 |
| 6,234,709 B1 | 5/2001 | Sorkin | |
| 6,308,383 B1 * | 10/2001 | Schrader | 24/265 H |
| 6,424,598 B1 | 7/2002 | Schultz et al. | |
| 6,431,102 B1 * | 8/2002 | Askestad et al. | 114/200 |
| 2006/0201100 A1 * | 9/2006 | Langwadt et al. | 52/741.1 |
| 2010/0080649 A1 * | 4/2010 | Wallstein et al. | 403/369 |
| 2011/0094432 A1 | 4/2011 | Petersen et al. | |

OTHER PUBLICATIONS

International Search Report mailed on Jun. 13, 2011 for PCT Patent Application No. PCT/CA2011/000368, 2 pages.

International Preliminary Report on Patentability received on May 2, 2012 for PCT Patent Application No. PCT/CA2011/000368, 6 pages.

Taylor, Robert J., "Interaction of Anchors With Soil and Anchor Design," Naval Civil Engineering Laboratory, Technical Note N-1627. Port Hueneme, Calif., Apr. 1982, pp. 1-50.

* cited by examiner

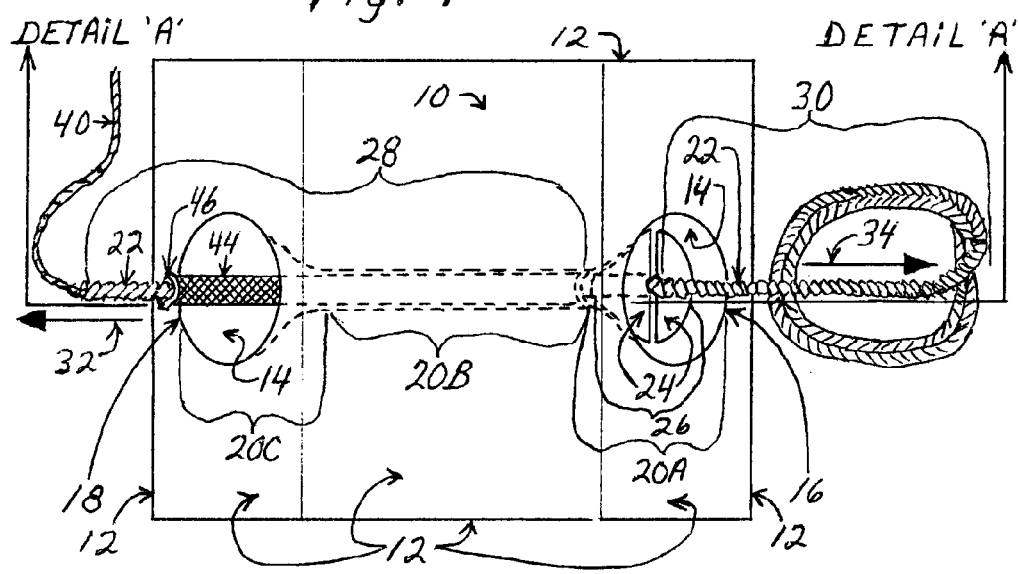
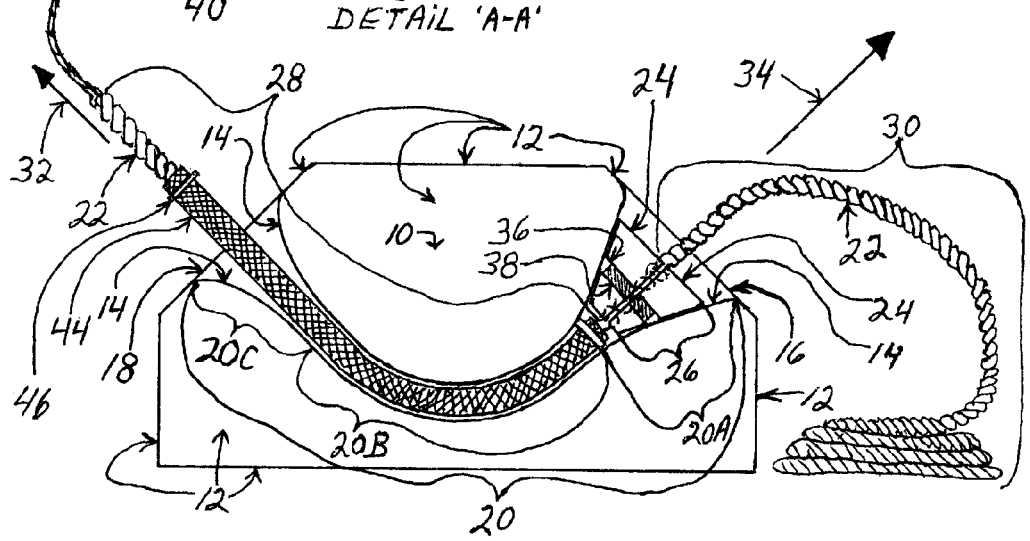

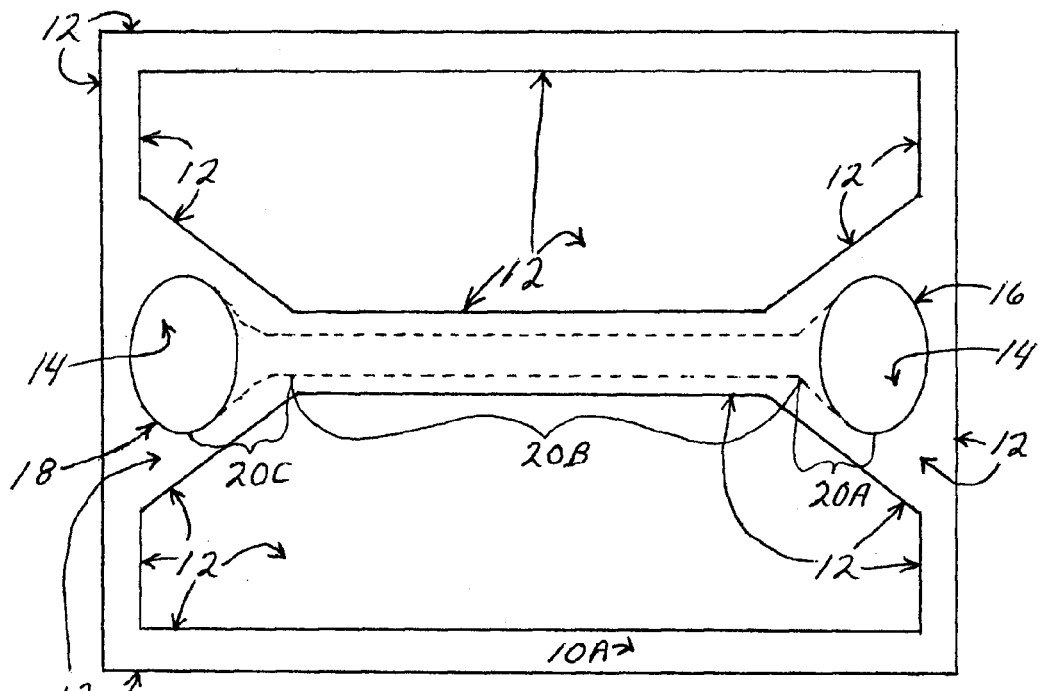
Fig. 5
Fig. 6
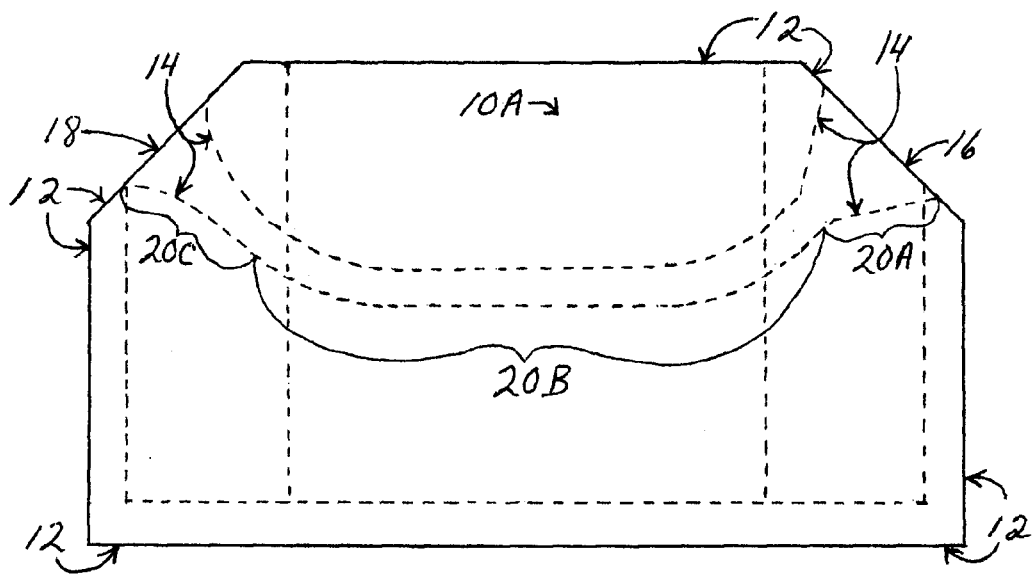

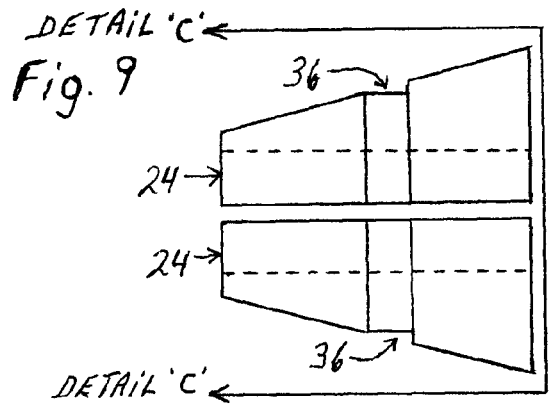
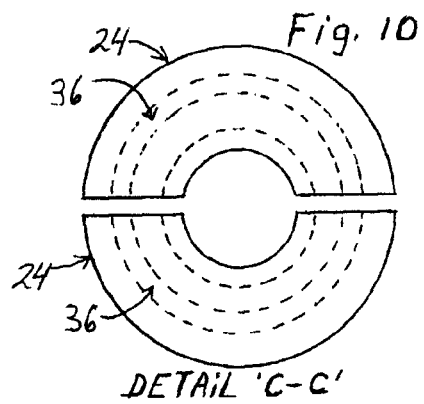
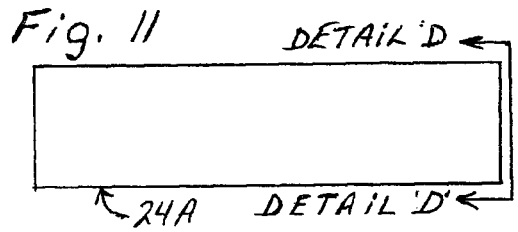
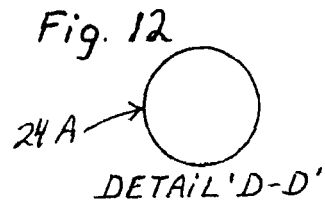
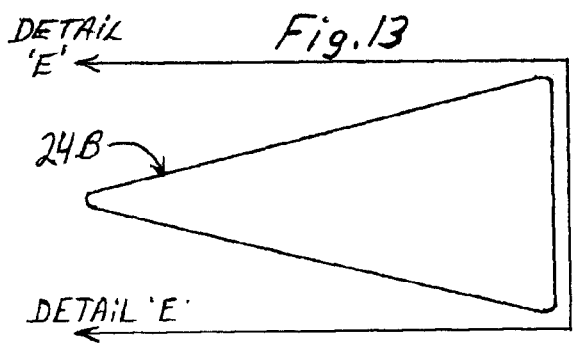
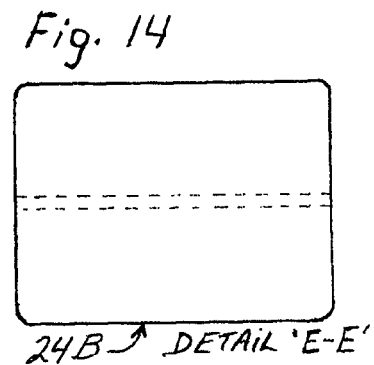
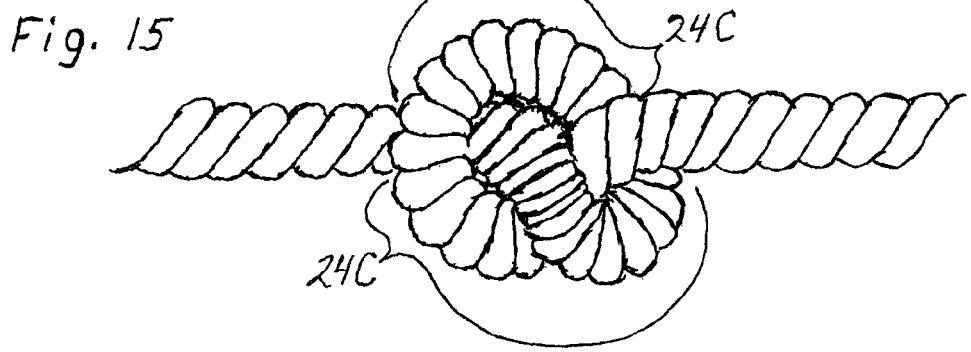

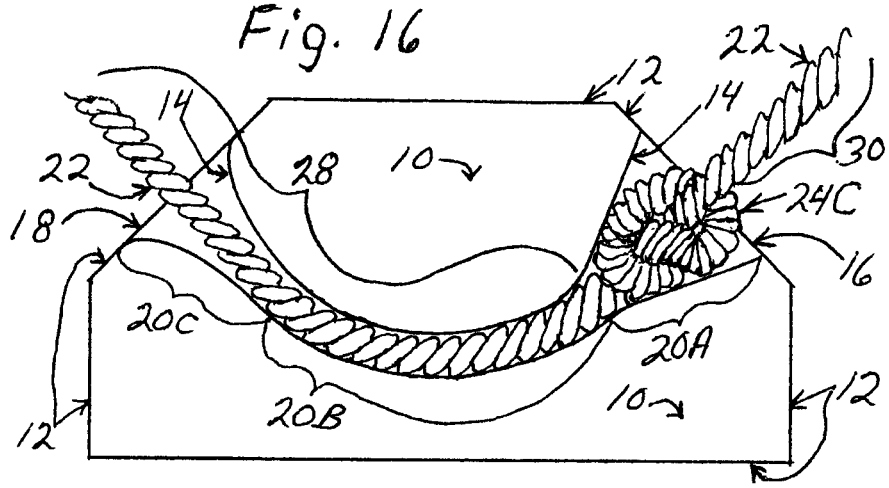
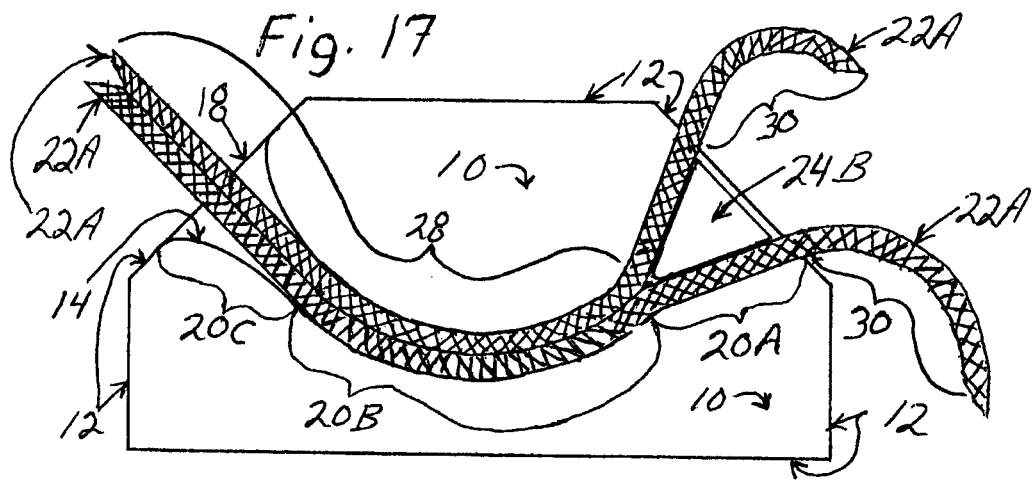
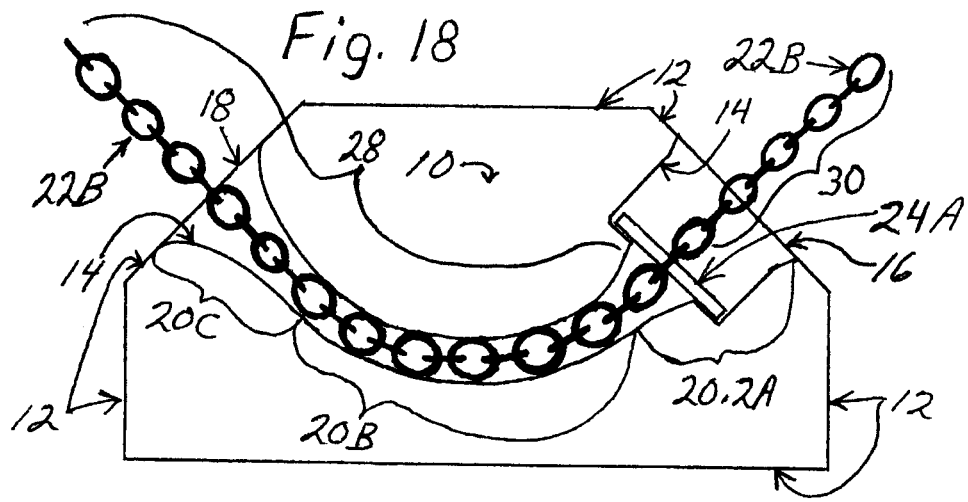

DETAIL 'F'

DUCT GRIP ANCHOR SYSTEM

This application is a National Stage of International Application No. PCT/CA2011/000368, filed Apr. 1, 2011, which claims priority to Canadian Application No. 2,698,434, filed Apr. 1, 2010, the disclosures of which are incorporated by reference herein.

FIELD

The present invention relates to a connection system that functions via a cross-sectional dimension disparity between a duct section located in a solid body object and a restraint device in place on a flexible interconnection device that traverses that duct such that a compressive action occurs that unidirectionally fixes the components together in proportion to the magnitude of the forces involved. The primary expected application is as a marine anchoring system connection technique.

BACKGROUND

There has long been a need to connect an anchoring object to an anchored object using a flexible interconnection device. The flexible qualities of the flexible interconnection device allow dynamic conditions that typically aggravate the condition of various components, especially the terminal linkage components between the flexible interconnection device and the anchor or anchored object. Mitigating this aggravation requires particular designs and materials that at present are more of a compromise rather than a solution or are limited in application. One method to effect a terminal connection that minimizes aggravation in a particular application is that used in the manufacture of pre-stressed concrete products as detailed in U.S. Pat. No. 3,820,832 (Brandestini et al.). A method to minimize the detrimental effects of flexing of an interconnecting device used in off-shore floating structures is detailed in U.S. Pat. No. 6,422,316 B1 (Shutz et al.).

SUMMARY

There is provided a connection system comprised of an object, such as a concrete anchor, with an interior surface that defines an open ended duct with a reducing cross-sectional dimension aspect, a flexible interconnection device, such as a fibrous strap, and a restraint device, such as a wedge. The flexible interconnection device is smaller in cross-sectional dimension than all the cross-sectional dimensions of the duct. The reducing cross-sectional dimension aspect of the duct is smaller than at least one of the cross-sectional dimensions of the ends of the duct. A restraint device in place on a portion of the flexible interconnection device forms a combination that is smaller in cross-sectional dimension than the duct end that it enters but of a larger cross-sectional dimension than a reducing cross-sectional dimension of the duct that is smaller than the duct end through which the combination entered. When a force acting on the flexible interconnection device initiates and maintains surface contact between a larger cross-sectional dimension of the combination and a smaller reducing cross-sectional dimension of the duct, they become fixed together. The effectiveness of the fixed condition is proportional to the magnitude of the force that causes the surface contact. The siting of the surface contact can be such that it; allows the whole combination to be within the confines of the duct, is able to utilize a robust structure to protect the connection from incidental damage, provides structural strength for the connection and allows the use of optimal materials and complementary shapes that maximize the effectiveness of the fixed condition. The fixed condition is able to be readily discontinued when the forces that cause the surface contact are no longer present or are negated. With the duct being integral within an object the quality of the connection which fixes the components together is based on the most dependable, robust and durable aspects of the object's structure and components non-integral to the object are able to be readily replaced and composed of optimal materials.

There will hereinafter be described and illustrated embodiments in which the object that defines a duct is; a concrete block anchor, a concrete block anchor with multiple ducts, a concrete anchor designed to contain extraneous weight, a bell buoy designed to float on water, not integral to a bell buoy that floats on water but is an adjunct to it and demountable from it, or an object that attaches to and alters the relative weight of a portion of a flexible interconnection device. It will be apparent to one skilled in the art that there are numerous types of materials, forms and dimensions for these objects and the structures they are combined with.

There will hereinafter be described and illustrated embodiments in which; a restraint device is similar to a truncated cone that is bisected into symmetric halves that have large grooves on a face, the restraint device is similar to a rod, the restraint device is similar to a wedge, and the restraint device is a specific alteration to the basic form of the flexible interconnection device itself. It will be apparent to one skilled in the art that there are numerous variations in sizes, materials and shapes to be utilized to perform as a restraint device.

There will hereinafter be described and illustrated embodiments in which a flexible interconnection device is; a fibrous rope which has been fixed to a duct, a fibrous strap which has been fixed to a duct, a chain which has been fixed to a duct, and a single undefined flexible interconnection device that is fixed to ducts in two separate objects, one of which is intermediately located between an anchored and an anchoring object. It will be apparent to one skilled in the art that these illustrations represent a duct grip anchor system wherever a duct with a reducing cross-sectional dimension section, a flexible interconnection device and a restraint device interact so as to become fixed together according to the teachings of the duct grip anchor system.

It will be appreciated that there are numerous engineering design criteria that must be considered before designing an anchoring system. As such, all the following descriptions and illustrations are to be considered for explanatory purposes only.

BRIEF DESCRIPTION OF THE DRAWINGS

These features and other features will become apparent from the following descriptions in which reference is made to the appended drawings, the drawings are intended for the purpose of illustration only and are not intended to be in any way limiting, wherein:

FIG. 1 is a top view of a terminal object shaped and of a weight so as to be suitable as an anchor that utilizes the teachings of the duct grip anchor system. Also illustrated are ancillary components that enhance the application of the teachings of the duct grip anchor system.

FIG. 2 is a side view of section Detail 'A-A' of FIG. 1.

FIG. 5 is a side view of a terminal object shaped so as to be suitable as an anchor, to contain extraneous weight so as to be effective as an anchor and utilize the teachings of the duct grip anchor system.

FIG. 6 is a top view of FIG. 5.

FIG. 9 is a side view of a restraint device which is similar in shape to a symmetrically bisected truncated cone, each half having a very large groove centered lengthwise on the bisecting face and shaped such that they will effectively compress a flexible interconnection device placed between them in the grooves.

FIG. 10 is a side view of section Detail 'C-C' of FIG. 9.

FIG. 11 is a side view of a restraint device which is shaped similar to a round rod.

FIG. 12 is a side view of section Detail 'D-D' of FIG. 11.

FIG. 13 is a side view of a restraint device which is similar in shape to a wedge.

FIG. 14 is a side view of section Detail 'E-E' of FIG. 13.

FIG. 15 is a view of a restraint device which is an alteration of the basic form of the flexible interconnection device, in this example by forming a knot in the flexible interconnection device.

FIG. 16 is a side view of a duct grip anchor system which utilizes a flexible interconnection device which is a fibrous rope, a restraint device similar to the knot as illustrated in FIG. 15, and a terminal object that defines a duct similar to the section detail illustrated in FIG. 2.

FIG. 17 is a side view of a duct grip anchor system which utilizes a flexible interconnection device which is a fibrous strap, a restraint device similar to the wedge as illustrated in FIG. 13, and a terminal object that defines a duct similar to the section detail that is illustrated in FIG. 2.

FIG. 18 is a side view of a duct grip anchor system which utilizes a flexible interconnection device which is a chain, a restraint device similar to the rod as illustrated in FIG. 11, and a terminal object that defines a duct similar to the section detail illustrated in FIG. 2 but which also includes angular features.

DETAILED DESCRIPTION

Figure 7:
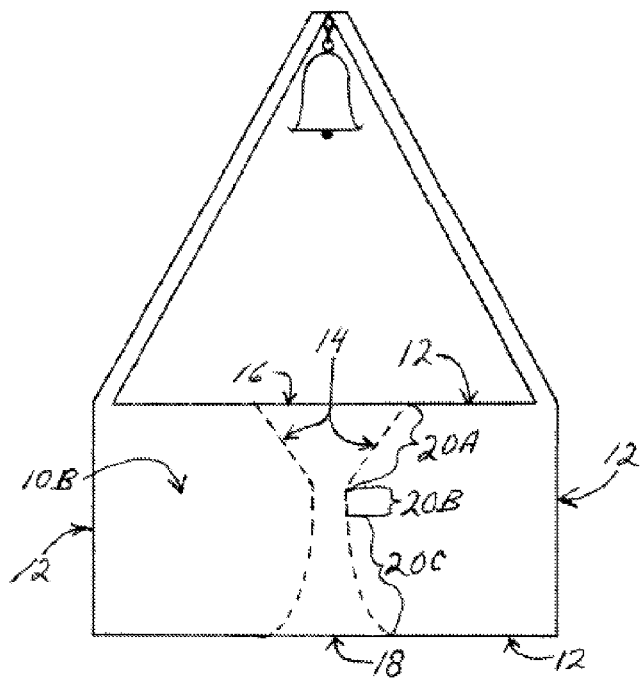
FIG. 7 is a side view of a terminal object designed to be anchored and float on a liquid and utilize the teachings of the duct grip anchor system such that they are integral to the terminal object.
Figure 8:
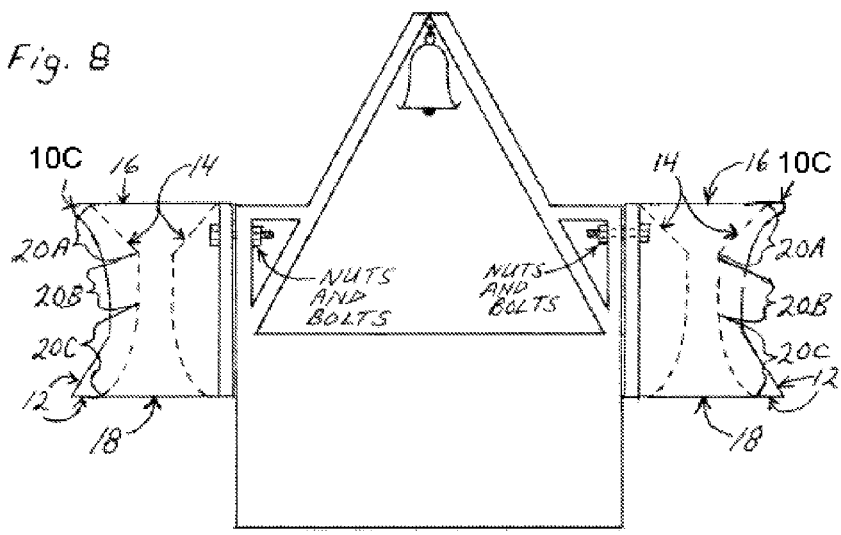
FIG. 8 is a side view of an object designed to be anchored and float on a liquid and attached to it are separable objects that are in accordance with the teachings of the duct grip anchor system. The attached objects are adjunct to and demountable from an object that is designed to float.
Figure 19:
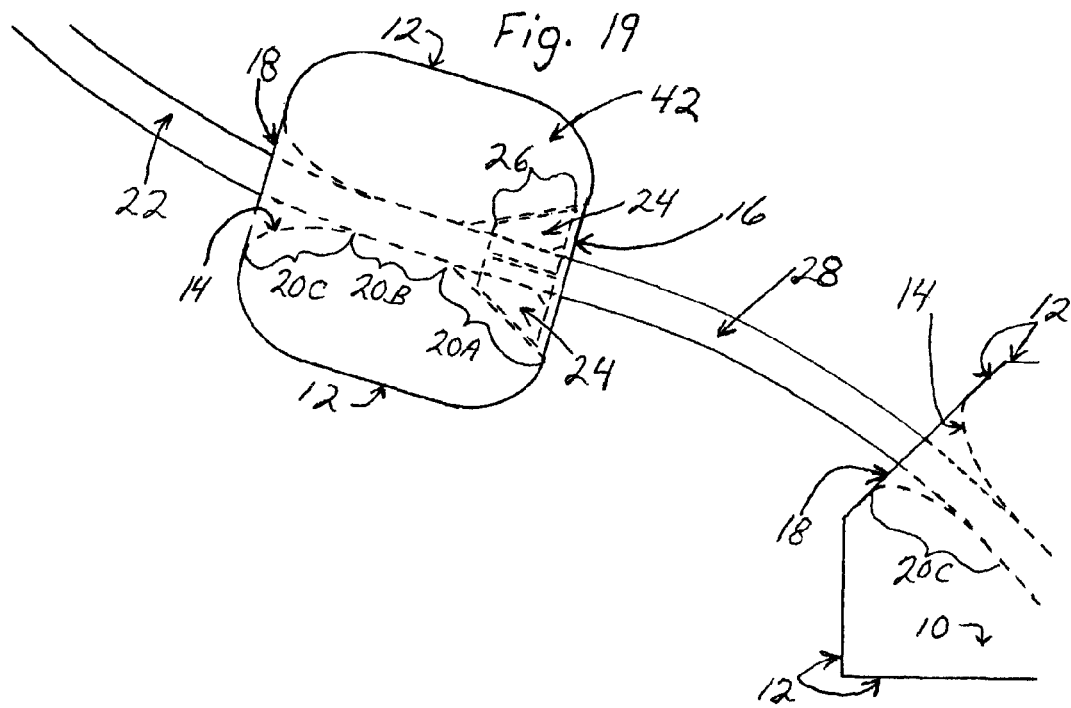
FIG. 19 is a side view of a duct grip anchor system in which the object that defines the duct is neither a terminal anchor object or terminal anchored object but is an intermediate object which is intended to alter the relative weight of a section of the flexible interconnection device while allowing beneficial movement of the flexible interconnection device to which it is fixed.
Figure 20:
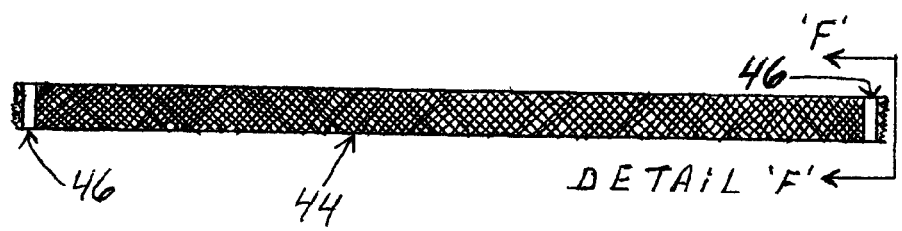
FIG. 20 is a side view of a protective sleeve and a fastener that holds it in place when they are applied over a section of a flexible interconnection device that may be prone to damage.
Figure 21:
FIG. 21 is a side view of a protective sleeve fastener device of a type that utilizes Velcro™.
Figure 22:
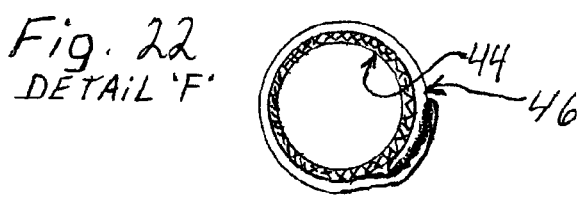
FIG. 22 is a view of section Detail 'F'.

A duct grip anchor system will now be described with reference to FIG. 1 through FIG. 7. A section of a flexible linking component of an anchor system connects two terminal objects. A terminal object has at least one open ended duct with a first duct end with a first cross-section dimension that is larger than a combination that is comprised of a flexible interconnection device and a restraint device in place on the flexible interconnection device. Adjacent to the first duct end is an interior section of the duct that; has a reducing cross-section dimensions section smaller than the first cross-sectional dimension, resembles a flared shape which diminishes in it's cross-section towards the interior of the terminal object and will accommodate a combination within the confines of the duct. The duct also has a second duct end with a second cross-sectional dimension outside of which is a portion of the flexible interconnection device, referred to as a bitter end, that is intended to be attached to a separate terminal object. A force applied to the bitter end that places the combination within the reducing cross-sectional dimension section of the duct and initiates contact between a surface of the larger cross-sectional dimensions of the combination and a surface of the smaller reducing cross-sectional dimension section of the duct is referred to as a tensional force. The forced contact between those two surfaces results in an interaction that causes them to become fixed together while the tensional force exists. A portion of a flexible interconnection device called a reserve component, is that portion which remains outside the first duct end and is intended to aid in the disassembly of the connection, not to form a link to another object. A placement maintaining device that can utilize a placement maintaining feature on a restraint device keeps a restraint device in place on the flexible interconnection device to form a combination independent of contact with the interior portion of the duct. FIG. 7 and FIG. 8 illustrate that the duct grip anchor system is also a functional connection system when it is a minor structure that is demountable from, and an adjunct to, a major structure. FIG. 9 through FIG. 15 illustrate devices and techniques which act as restraint devices. FIG. 16 through FIG. 18 illustrate duct grip anchor system components in place together as they could be when in service. FIG. 19 illustrates an intermediate object which is designed to attach to and alter the relative weight, such as the buoyancy, of selected portions of a flexible interconnection device that forms a link between two terminal objects, such as an anchored object and it's anchor, while still allowing beneficial mobility of the flexible interconnection device to which it is attached. FIG. 20 illustrates a protective sleeve and it's fastening device for a flexible interconnection device. FIG. 21 and FIG. 22 illustrate views of the protective sleeve and it's components.

Structure and Relationship of Parts:

Referring to FIG. 1 and FIG. 2 the duct grip anchor system includes a flexible interconnection device 22, such as a rope, connected to terminal objects composed of a material that provides the strength to maintain a specific shape, such as a concrete block being an anchoring terminal object 10, with an exterior surface 12 and an interior surface 14 that define an open ended duct. The duct has a first end with a first cross-sectional dimension 16 and a second end with a second cross-sectional dimension 18 and an interior portion 20 that will be described into three sections; a reducing cross-sectional dimension section 20A, a consistent cross-sectional dimension section 20B and an increasing cross-sectional dimensions section 20C. A flexible interconnection device 22, such as a rope, with a restraint device 24, such as a split cone, in place on it forms a combination 26. A restraint device 24 may have a placement maintaining feature 36 and utilize a placement maintaining device 38, such as elastomeric self-adhesive tape, to ensure that a combination 26 can be formed and maintained independent from contact with the interior portion 20. A tensional force 32 is a force acting on that section of a flexible interconnection device 22 referred to as a bitter end section 28, which is that portion of the flexible interconnection device 22 that has exited the second duct end with a second cross-sectional dimension 18 and is intended to be connected to a separate terminal object, so as to cause the flexible interconnection device 22 to traverse the interior portion 20 of the duct. The tensional force 32 also places a combination 26 within the confines of an interior portion 20 described as a reducing cross-sectional dimension section 20A and causes surface contact to occur between the areas of a reducing cross-sectional dimension section 20A that are smaller in cross-sectional dimension than and the larger cross-sectional dimensions surface areas of a combination 26. The surface contact pressure causes an interaction between a combination 26 and a reducing cross-sectional dimension section 20A such that as the contact pressure increases in magnitude due to a tensional force 32, so does the effectiveness of fixing a combination 26 and a reducing cross-sectional dimension section 20A together. When a flexible interconnection device 22 does not have a tensional force 32 acting on it or experiences a negating force 34, which is a force sufficient to withdraw the flexible interconnection device 22 out of the anchoring terminal object 10 through the first duct end with a first cross-sectional dimension 16, a combination 26 and a reducing cross-sectional dimension section 20A lose the surface contact between them and thus become unfixed and separable. A portion of the flexible interconnection device 22 remaining outside the first duct end with a first cross-sectional dimension 16 is called a reserve component 30 whose purpose is to readily allow the application of a negating force 34. A pilot line 40, which is a readily handled flexible line typically being of a much smaller cross-sectional dimension relative to the flexible interconnection device 22, may be temporarily attached to the flexible interconnection device 22 to facilitate the installation or removal of a flexible interconnection device 22 from an interior portion 20. A protective sleeve 44 held in place by a protective sleeve fastener 46 covers and protects a flexible interconnection device 22 from damage, such as where it is within and exits from the increasing cross-sectional dimension section 20C to outside the second duct end with a second cross-sectional dimension 18. FIG. 19 illustrates an intermediate object 42, such as a concrete ovoid form, that alters the relative weight, such as the buoyancy, of a bitter end section on which it is fixed in placed but still allows that bitter end section beneficial movement. A restraint device 24 in place on the bitter end section 28 forms a combination 26 that interacts with an interior portion 20 reducing cross-sectional dimension section 20A of the intermediate object 42 so as to fix the intermediate object 42 to the bitter end section 28.

Operation:

The use and operation of the duct grip anchor system will now be described with reference to FIG. 1 and FIG. 2. An anchoring terminal object 10, such as a concrete block anchor, is placed in position. A flexible interconnection device 22 has a restraint device 24 put in place, and if required held in place with a placement maintaining device 38, such as elastomeric tape, to create a combination 26. Temporarily attached to what is intended to be a bitter end section 28 of a flexible interconnection device 22 is a pilot line 40 that facilitates the installation of a flexible interconnection device 22 into a duct first end with a first cross-sectional dimension 16, through an interior portion 20, out the duct second end with a second cross-sectional dimension 18 and onwards towards a separate terminal object. A tensional force 32 applied to a bitter end section 28 of a flexible interconnection device 22 to ensures the continued traversing movement of a flexible interconnection device 22 brings the surfaces of a combination 26 and an interior portion 20 reducing cross-sectional dimension section 20A into contact with a resultant interaction so as to fix them together, after which a bitter end section 28 can be secured to a separate terminal object (e.g. anchored terminal object 10B FIG. 7). A pilot line 40 may now be removed from a bitter end section 28. A tensional force 32 such as that via a dynamic relative position or static tension between two terminal objects maintains a surface contact pressure between a combination 26 and an interior portion 20 reducing cross-sectional dimension section 20A that is proportional to the tensional force 32, an interaction and, thus, a connection to fix a flexible interconnection device 22 to an anchoring terminal object 10. When it is required to disengage a flexible interconnection device 22 from an object that uses the duct grip anchor system, a tensional force 32 is removed or a negating force 34 can be applied to a reserve component 30. In a situation where the duct grip anchor system utilizes multiple flexible interconnection devices, restraint devices and terminal objects the definitions for shared components may change according to the point of reference and sequence of the discrete actions occurring in the process of the installation of components.

Variations:

In order for the duct grip anchoring system to be fully understood, some possible variations will be described. When the components are identical, identical reference symbols will be assigned.

Figure 3:
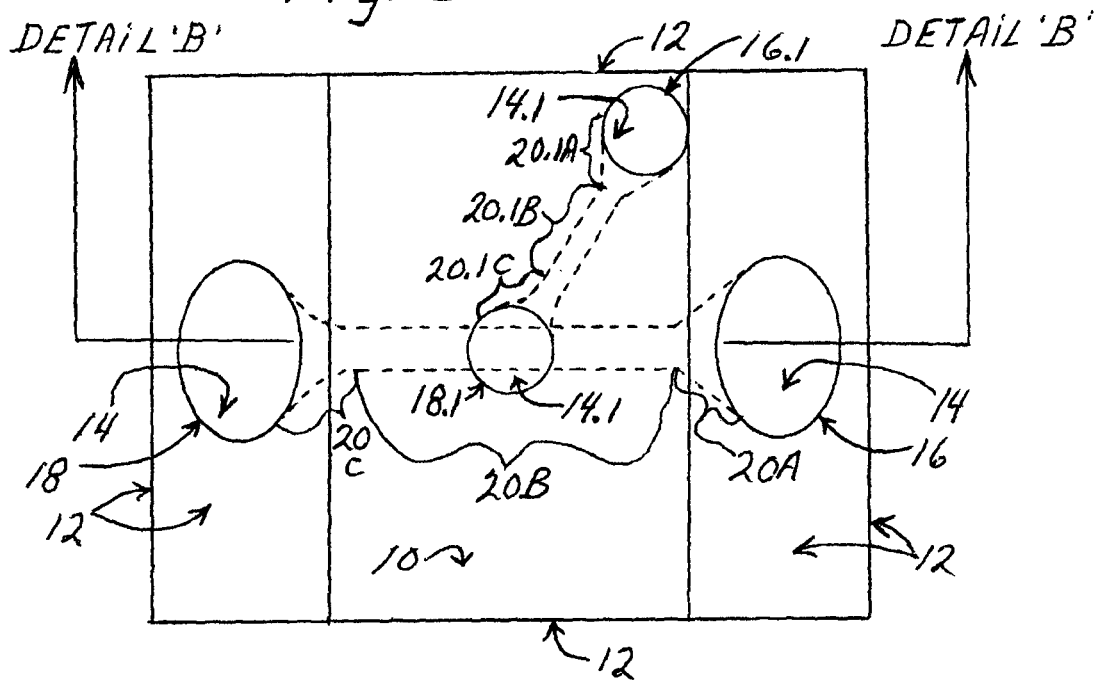
FIG. 3 is a top view of a terminal object designed to be an anchor similar to that illustrated in FIG. 1 and in accordance with the teachings of the duct grip anchor system there is an exterior surface and interior surfaces that defines two ducts, the smaller one of which is intended for a temporary lifting duty.
Figure 4:
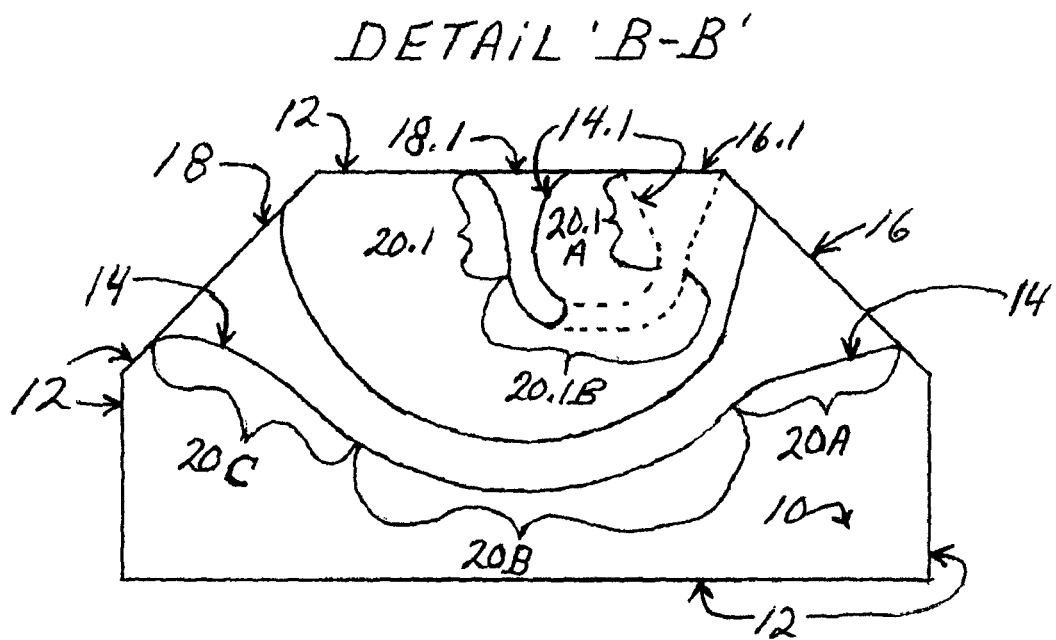
FIG. 4 is a side view of section Detail 'B-B' of FIG. 3

FIG. 3 and FIG. 4 have been included to illustrate that multiple ducts are suitable in a single object. Since one of these ducts is noticeably different, it is assigned different designations. FIG. 3 and FIG. 4 have an object with an exterior surface 12 and interior surface 14 and a second but different interior surface designated 14.1, a duct with an interior portion 20 and a second duct with an interior portion different in size and shape so it is designated interior portion 20.1. Interior portion 20.1 has three sections, reducing cross-sectional dimension section 20.1A, consistent cross-sectional dimension 20.1B and increasing cross-sectional dimension 20.1C, and a first end with a first cross-sectional dimension 16.1 and a second end with a second cross-sectional dimension 18.1.

FIG. 5 and FIG. 6 are included to illustrate a type of terminal object that is intended to be an anchor but have minimal inherent weight, so it is shaped to be suitable as an anchor and able to contain extraneous weight so as to be effective as an anchor. The minimum inherent weight facilitates it's movement and placement. The purpose of this object is the same as for the similar anchoring terminal object 10 but the shape and qualities are noticeably different so it is designated minimum weight anchoring terminal object 10A.

FIG. 7 illustrates a terminal object that floats and is anchored instead of anchoring, so it is labeled a anchored terminal object 10B.

FIG. 8 illustrates a different class of terminal object. Whereas previously a major structure performed additional functions as well as defining an inherent duct, this major structure performs functions but has no inherent duct. Instead, connected to it is a class of terminal object that is a minor structure that defines an inherent duct and that is intended to function solely as a connection system and is attached to and is an adjunct to the major structure, so it is called a terminal minor object 10C.

FIG. 9 through FIG. 15 illustrate a variety of restraint devices which may be utilized on flexible interconnection devices. Due to the ubiquitous nature of the rope form, restraint device 24 illustrated in FIG. 9 and FIG. 10 could be in common use. FIG. 11 and FIG. 12 illustrates a rod shaped restraint device 24A. FIG. 13 and FIG. 14 is included to illustrate the flat wedge shaped restraint device 24B, which is appropriate in combination with strap forms of flexible interconnection devices. FIG. 15 illustrates a restraint formed by altering the basic form of a section of a flexible interconnection device 22 by contorting that section, in this case by forming a knot, to become restraint device 24C.

FIG. 16 through FIG. 18 illustrate restraint devices in place on their compatible flexible interconnection devices, some of which are different than flexible interconnection device 22. FIG. 16 illustrates the form of a flexible interconnection device 22 that has been altered into a knot, which is restraint device 24C. FIG. 17 illustrates a wedge shaped restraint device 24B in place on a fibrous strap that is flexible interconnection device 22A. FIG. 18 illustrates restraint device 24A in place on a metallic chain that is flexible interconnection device 22B. There is also illustrated one section of the interior portion 20 that is different than before as it features an angular form, so it is designated interior portion reducing cross-sectional dimension section 20.2A.

FIG. 19 illustrates an intermediate object 42 that neither anchors nor is anchored but acts as a method to alter the relative weight, such as by being an ovoid form composed of concrete, of a section of a flexible interconnection device 22 to which the intermediate object 42 has become fixed.

FIG. 20 through to FIG. 22 are illustrations of a protective sleeve 44 and a protective sleeve fastener device 46 that secures them to flexible interconnection devices.

Figure 23:
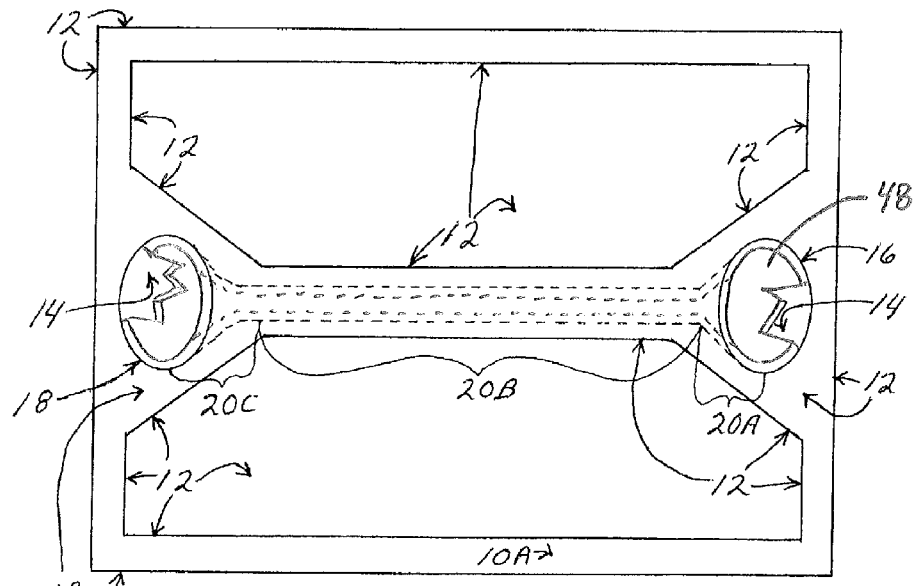
FIG. 23 is a side view of the terminal object of FIG. 5 but further including a liner.
Figure 24:
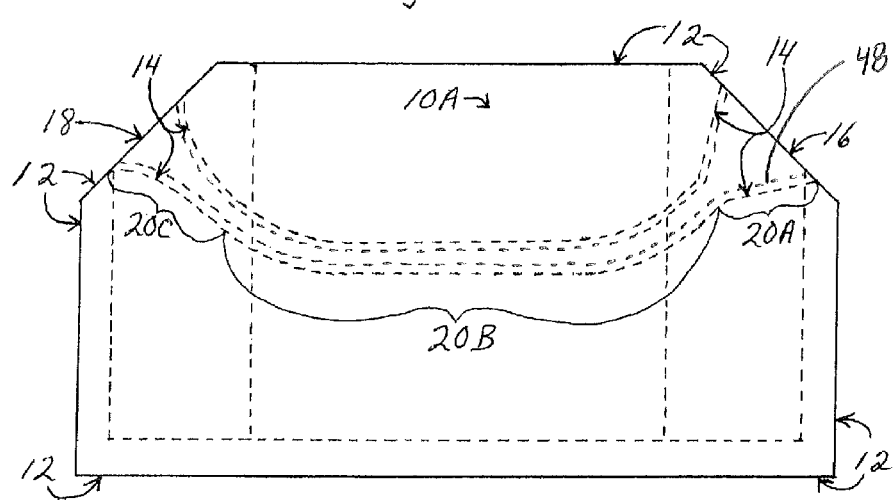
FIG. 24 is a top view of FIG. 23.

FIG. 23 and FIG. 24 are included to illustrate a liner 48 on the interior surface 14 and in the interior portion 20 of the terminal object 10A. The liner 48 may be permanent or demountable.

Advantages/Cautionary Warning:

Typical anchor systems utilizing flexible interconnection devices have terminal connective components that are peripheral to the main structure of the anchored item and the anchoring item. This peripheral location; makes the terminal connective components prone to impact damage, requires supplementary structural extensions between the primary object of the anchored or anchoring item and the peripheral connective components, inherently have areas of great friction and stress that must be mitigated as they are unwanted and only cause degradation to the connection, makes replacement and repair of degraded connective components frequently difficult, uneconomical and occasionally impossible which would make the anchor and anchoring item useless. When compounding factors such as corrosive environments and abrupt variable stress vector forces are added to the basic detrimental properties of the peripheral location of the connective components, the remedial solutions escalate costs but are usually limited in effectiveness since there must be compromises in the materials used due to design restriction paradigms.

With the duct grip anchor system as described, the disadvantages of the peripheral location for terminal connective components for flexible interconnection devices are eliminated or minimized. The terminal connective components can be secure and protected within a duct that is integral to a robust structure, friction and stress generated in service are used to benefit the connection, optimal materials can be used, and placement or replacement of consumable components is simple and always possible. Ancillary components are available to allow different and more efficient methods of installation and repair. Examples would be pilot lines attached to bitter ends and reserve components and that are brought up to and secured to the anchored item in a marine application. That would allow the replacement of the flexible interconnection system and restraint device to the anchor without the need for divers, saving effort and money. New installations could have pilot lines utilized while placing new anchors at their service site, then the service flexible interconnection device with it's compatible restraint device could be installed later without the need for divers. Floating anchored items could have; the duct grip anchor system simply and permanently located out of degrading liquid environments, allow the length of the flexible interconnection device to be adjusted conveniently as required, have spare length of the flexible interconnection device kept ready for service, connective components readily accessible to be fixed or unfixed, components that are reusable and are easily replaced. The ducts are always able to accommodate a connection of some sort short of catastrophic degradation to their primary structure.

Marine anchor system component service life benefits by reducing abrupt impulse forces on the connective components during variable vector tension forces events on the flexible interconnection device by increasing it's weight. This weight may be inherent, such as with metal chain, or extraneous to the flexible interconnection device, such as with securing an intermediate object to a section of a fibrous rope that connects two objects. That weight may also become a problem by adding substantial weight where it contributes nothing to benefit system performance but increases cost and friction on the components or the difficulty to fix it in place without contributing to the degradation of the flexible interconnection device at the area of connection.

The duct grip anchor system allows for the use of optimal amounts, types of materials and calculated specific placement of beneficial weight for reducing tension impulse loads.

In this patent document a reference to an element by the indefinite article "a" or "an" does not exclude the possibility that more that more than one of the elements is present or could be added, unless the context requires that there be one and only one of the elements.

The following claims are to be understood to include what is specifically illustrated and described above, what is conceptually equivalent, and what can be obviously substituted. Those skilled in the art will appreciate that various adaptions and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An anchor system comprising:
   at least one flexible interconnection device;
   at least one restraint device on the at least one flexible interconnection device, the at least one restraint device and the at least one flexible interconnection device forming at least one combination; and
   at least one terminal object comprising an anchoring object having an exterior surface and at least one interior surface that defines at least one duct for receiving a portion of the flexible interconnection device, the at least one duct having a first end extending through the exterior surface at a first position, a second end extending through the exterior surface at a second position spaced from the first end, and an interior portion between the first end and the second end;

wherein the anchoring object comprises a metallic-iron-free load-bearing structure that defines a load-bearing surface such that when the flexible interconnection device is positioned through the duct and when a tensional force is applied to the flexible interconnection device, the tensional force urges the at least one combination against the load-bearing surface such that the metallic-iron-free load-bearing structure impedes the at least one combination from traversing the duct in response to the tensional force by bearing the resultant load; and wherein the anchoring object is adapted to be held in place by gravity such that, when the anchoring object is subjected to the tensional force from the flexible interconnection device, gravity acting on the anchoring object causes frictional engagement, between the anchoring object and a solid surface supporting weight of the anchoring object, that causes the anchoring object to resist movement caused by the tensional force, to anchor an anchored object when the anchored object is spaced apart from the anchoring object and secured to the flexible interconnection device which is shared with the anchoring object.

2. The anchor system of claim 1, wherein the interior portion of the at least one duct comprises a section comprising the load-bearing surface.

3. The anchor system of claim 2, wherein the section of the at least one duct comprising the load-bearing surface is sized to accommodate the at least one combination.

4. The anchor system of claim 1, wherein cross-sectional dimension changes of the at least one duct's interior portion define a flared form.

5. The anchor system of claim 1, wherein cross-sectional dimension changes of the at least one duct's interior portion define an angular form.

6. The anchor system of claim 1, wherein the at least one duct has a permanent lining.

7. The anchor system of claim 1, wherein the at least one duct has a demountable lining.

8. The anchor system of claim 1, wherein at least one protective sleeve is in place to cover selected portions of the at least one flexible interconnection device to prevent damage to the at least one flexible interconnection device.

9. The anchor system of claim 1, wherein the at least one restraint device has the ability to be secured in place on the at least one flexible interconnection device independent of contact with the at least one duct.

10. The anchor system of claim 1, wherein the at least one restraint device is free of metallic iron.

11. The anchor system of claim 10, wherein the at least one combination is free of metallic iron.

12. The anchor system of claim 1, wherein the at least one flexible interconnection device comprises a non-metallic fibrous rope.

13. The anchor system of claim 12, wherein the at least one restraint device comprises a knot in the fibrous rope.

14. The anchor system of claim 12, wherein the at least one restraint device comprises a truncated cone.

15. The anchor system of claim 1, wherein the at least one flexible interconnection device comprises a non-metallic fibrous strap.

16. The anchor system of claim 15, wherein the at least one restraint device comprises a wedge-shaped restraint device in place on the fibrous strap.

17. The anchor system of claim 1, wherein the at least one flexible interconnection device comprises a chain comprising a plurality of chain links.

18. The anchor system of claim 17, wherein the at least one restraint device comprises a rod extending through one of the plurality of chain links.

19. The anchor system of claim 1, wherein the interior portion of the duct comprises a consistent cross-sectional dimension section and an increasing cross-sectional dimension section.

20. The anchor system of claim 19, wherein the interior portion of the duct further comprises a reducing cross-sectional dimension section.

21. The anchor system of claim 1, wherein the anchoring object comprises a concrete block anchor.

22. The anchor system of claim 1, wherein the at least one terminal object further comprises the anchored object spaced apart from the anchoring object and secured to the flexible interconnection device which is shared with the anchoring object such that gravity acting on the anchoring object causes the anchoring object to resist movement, and causes the anchoring object to anchor the anchored object and resist movement of the anchored object by accommodating the tensional force.

23. The anchor system of claim 22, wherein the anchored object has an exterior surface and an interior surface that defines at least one duct, each duct of the anchored object having a first end extending through the exterior surface at a first position and a second end extending through the exterior surface at a second position spaced from the first position, the first end having a first cross-sectional dimension, the second end having a second cross-sectional dimension, each duct of the anchored object having an interior portion between the first end and the second end, the interior portion having at least one cross-sectional dimension that is smaller than at least one of the first cross-sectional dimension or the second cross-sectional dimension of the duct.

24. The anchor system of claim 22, wherein the at least one terminal object further comprises at least one intermediate object between the anchoring object and the anchored object and spaced apart from the anchoring object and the anchored object.

25. The anchor system of claim 24, wherein the at least one intermediate object is secured to and alters the relative weight of a section of the at least one flexible interconnection device which is shared with the anchoring object, the at least one intermediate object having an exterior surface and an interior surface that is defined by a metallic-iron-free load-bearing structure of the intermediate object and that defines at least one duct, each duct of the at least one intermediate object having a first end extending through the exterior surface at a first position and a second end extending through the exterior surface at a second position spaced from the first position, the first end having a first cross-sectional dimension, the second end having a second cross-sectional dimension, each duct of the at least one intermediate object having an interior portion between the first end and the second end, the interior portion having at least one cross-sectional dimension that is smaller than at least one of the first cross-sectional dimension or the second cross-sectional dimension of the duct.

26. The anchor system of claim 25, wherein at least one additional restraint device is in place on the at least one flexible interconnection device that is fixed to the anchoring object such that the at least one additional restraint device in place on the at least one flexible interconnection device that is fixed to the anchoring object becomes an at least one additional combination that is spaced from the anchoring object and from the anchored object, and that has at least one cross-sectional dimension smaller than at least one of the first cross-sectional dimension or second cross-sectional dimension of the at least one intermediate object and having at least one cross-sectional dimension that is larger than at least one cross-sectional dimension of the interior portion of the at least one intermediate object.

27. The anchor system of claim 26, wherein cross-sectional dimension changes of the at least one duct of the at least one intermediate object define a flared form.

28. The anchor system of claim 26, wherein cross-sectional dimension changes of the at least one duct of the at least one intermediate object define an angular form.

29. The anchor system of claim 26, wherein the at least one duct of the at least one intermediate object has a permanent lining.

30. The anchor system of claim 26, wherein the at least duct of the at least one intermediate object has a demountable lining.

31. The anchor system of claim 22, wherein the anchored object is adapted to float on water.

32. The anchor system of claim 1, wherein the anchoring object has sufficient inherent weight such that, when the anchoring object is subjected to the tensional force from the flexible interconnection device, gravity acting on the inherent weight causes the anchoring object to resist movement caused by the tensional force, to anchor the anchored object when the anchored object is spaced apart from the anchoring object and secured to the flexible interconnection device.

33. The anchor system of claim 1, wherein the anchoring object is configured to contain extraneous weight such that, when the anchoring object is subjected to the tensional force from the flexible interconnection device, gravity acting on the extraneous weight causes the anchoring object to resist movement caused by the tensional force, to anchor the anchored object when the anchored object is spaced apart from the anchoring object and secured to the flexible interconnection device.

34. The anchor system of claim 1, wherein the anchoring object is a marine anchor body.

35. The anchor system of claim 1, wherein the at least one flexible interconnection device comprises a non-metallic fibrous interconnection device.

36. The anchor system of claim 1, wherein the anchoring object comprises a deadweight anchor.

37. A method of installing the anchor system of claim 1, the method comprising placing the anchoring object in a body of water.

38. An anchor system comprising:
at least one flexible interconnection device;
at least one restraint device on the at least one flexible interconnection device, the at least one restraint device and the at least one flexible interconnection device forming at least one combination; and
at least one terminal object comprising an anchoring object having an exterior surface and at least one interior surface that defines at least one duct for receiving a portion of the flexible interconnection device, the at least one duct having a first end extending through the exterior surface at a first position, a second end extending through the exterior surface at a second position spaced from the first end, and an interior portion between the first end and the second end;
wherein the anchoring object defines a load-bearing surface such that when the flexible interconnection device is positioned through the duct and when a tensional force is applied to the flexible interconnection device, the tensional force urges the at least one combination against the load-bearing surface such that the load-bearing surface impedes the at least one combination from traversing the duct in response to the tensional force by bearing the resultant load; and
wherein the interior portion of the duct comprises a consistent cross-sectional dimension section and an increasing cross-sectional dimension section; and
wherein the anchoring object is adapted to be held in place by gravity such that, when the anchoring object is subjected to the tensional force from the flexible interconnection device, gravity acting on the anchoring object causes frictional engagement, between the anchoring object and a solid surface supporting weight of the anchoring object, that causes the anchoring object to resist movement caused by the tensional force, to anchor an anchored object when the anchored object is spaced apart from the anchoring object and secured to the flexible interconnection device which is shared with the anchoring object.

\* \* \* \* \*